UNITED STATES PATENT OFFICE.

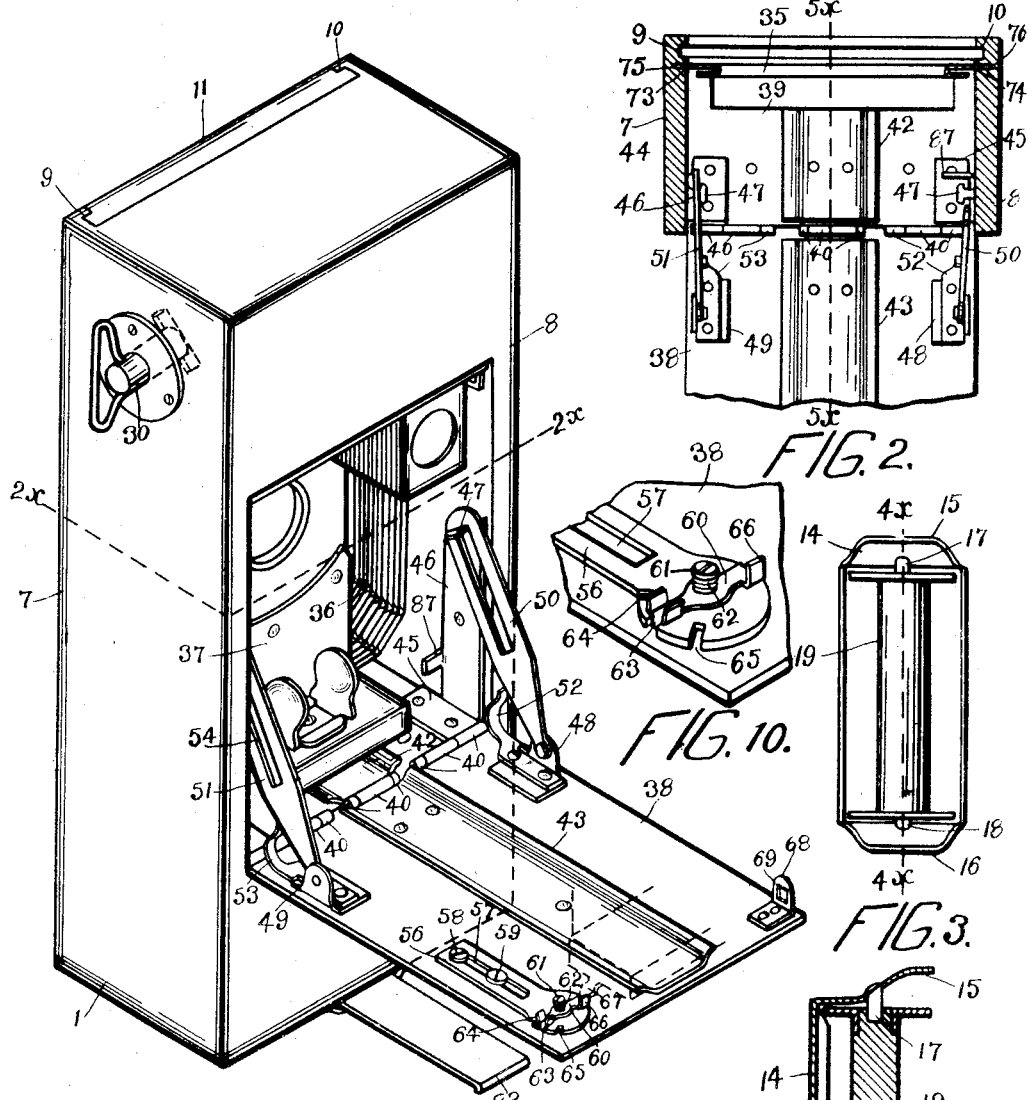
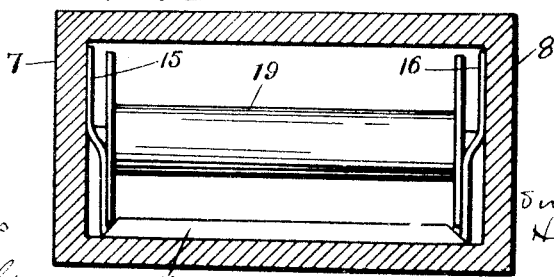

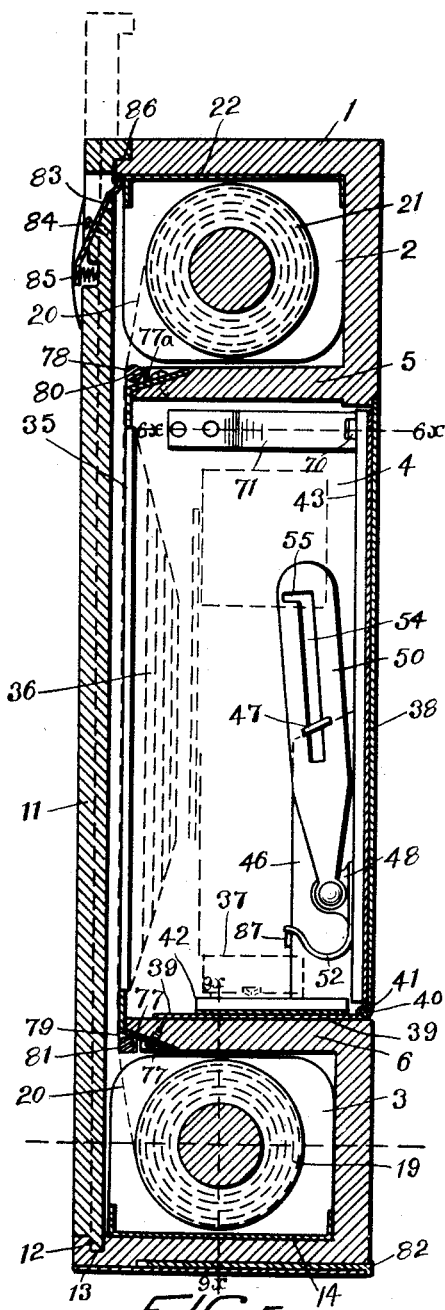
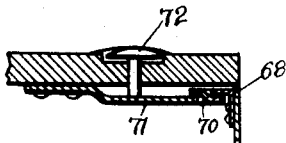
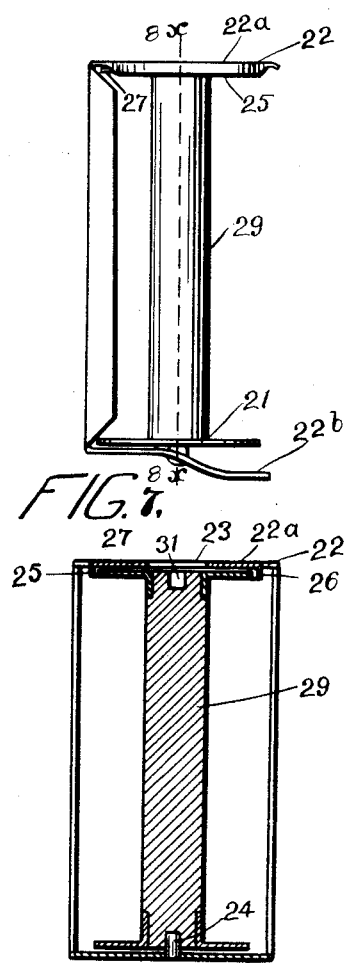

HENRY H. TURNER AND SIMON SCHIDAKOVITCH, OF ROCHESTER, NEW YORK, ASSIGNORS TO GUNDLACH-MANHATTAN OPTICAL COMPANY, OF ROCHESTER, NEW YORK, A CORPORATION OF NEW YORK.

CAMERA.

1,171,483.  Specification of Letters Patent.  Patented Feb. 15, 1916.

Application filed January 24, 1913. Serial No. 743,994.

*To all whom it may concern:*

Be it known that we, HENRY H. TURNER and SIMON SCHIDAKOVITCH, citizens of the United States, residing at Rochester, in the county of Monroe and State of New York, have invented certain new and useful Improvements in Cameras, of which the following is a specification.

The object of this invention is to provide a simple, durable and cheap camera.

Another object of our invention is to provide a folding bed for the camera integral with the hinge by which it is connected with the body of the camera.

Another object of our invention is to provide a mechanical stop for arresting the lens carrier in certain predetermined focal adjustments.

Another object of our invention is to construct the inner leaf, bed plate, side brackets, side arms, etc., as a unit independent of the body of the camera to facilitate the assembling of the parts.

Another object of our invention is to provide a sliding foot in the base of the camera to form a support therefor.

Another object of our invention is to provide a novel form of construction for the bellows frame and the camera frame, and for the assembling of these parts.

Another object of our invention is to provide self contained carriers for the film spools, forming an easy and efficient method of loading the camera.

These and other objects of our invention will be fully illustrated in the drawings, described in the specification and pointed out in the claims at the end thereof.

In the accompanying drawings, Figure 1 is a perspective view of the camera with the bed extended. Fig. 2 is a horizontal section through the camera taken on the line $2^x$—$2^x$ in Fig. 1, the bellows and lens front being omitted and the bed being partly broken away. Fig. 3 is a front view of the film carrier containing the supply roll. Fig. 4 is a sectional view of one of the film carriers, the section being taken on the line $4^x$—$4^x$ in Fig. 3. Fig. 5 is a vertical longitudinal section through the camera taken on the line $5^x$—$5^x$ in Fig. 2, showing the film carriers, frame, bellows, etc., in position. Fig. 6 is a section on the line $6^x$—$6^x$ in Fig. 5. Fig. 7 is a side view of the film carrier containing the feed or draft roll. Fig. 8 is a section on the line $8^x$—$8^x$ in Fig. 7. Fig. 9 is a section on the line $9^x$—$9^x$ in Fig. 5. Fig. 10 is an enlarged perspective view of the automatic stop device.

In the accompanying drawings reference numeral 1 indicates the camera body which is divided into three compartments, as shown in the cross section in Fig. 5, the compartments 2 and 3 being provided for holding the spools for the film and the compartment 4 being provided for the bellows and lens carrier. The partition plates 5 and 6 are provided for securing this separation of the various portions of the camera. The side members 7 and 8 are provided for completing the frame and these are grooved at 9 and 10 as shown in Figs. 1 and 2. Mounted to slide in these grooves is the back plate 11 which is correspondingly recessed to fit therewith, and which on its lower end has a tongue 12 to fit in a groove 13 provided in the bottom of the camera therefor, the arrangement of the parts being adapted to secure the exclusion of the light from the camera from the rear.

In the compartment 3 is placed a spool carrier 14 shown in Figs. 3 and 4. This carrier is U-shaped and has the flexible or spring sides 15 and 16 on which are mounted the pins 17 and 18, on which is adapted to turn the spool 19, on which spool the commercial films are always provided. The spring sides 15 and 16 are shown distended in Fig. 4 in the position which they will occupy when the carrier is removed from the camera frame. When the carrier is returned in the camera frame, as shown in Fig. 9, the sides 15 and 16 will be pressed inward toward each other, throwing tension upon the spool.

As shown in Fig. 5, the film 20 passes from the spool 19 to the spool 21. The spool 21 is mounted in a spool carrier 22, such as is shown in Figs. 7 and 8, which carrier is U-shaped. The side $22^a$ is provided with a perforation 23 and the side $22^b$ is provided with a pin 24. The side $22^a$ is also provided with segmental flanges 25 and 26 in which the disk end 27 of the spool is adapted to engage and by which it is held in place with its shank 29 concentric with the perforation 23. The side $22^b$ is normally sprung outward as is shown in Fig. 7, and when the carrier is placed in the camera frame this side is pressed up against the disk end of the spool 21 so as to throw a friction thereon. When the carrier and the spool are inserted in the camera frame the perforation 23 normally comes opposite the winding key 30 placed in the frame of the camera, as shown in Fig. 1, which winding key has a flat end that engages with the slot 31 in the end of the shank 29 shown in Fig. 8. By the engagement between the key 30 and the shank, the spool is turned for the purpose of drawing the film from the roller 19. In the middle compartment 4 of the camera is placed the bellows frame 35, the bellows 36, the lens carrier 37 and the bed plate 38, and the parts associated therewith. The bed plate 38 and the leaf 39 are each provided with knuckles 40, 40, with which engage pintles 41 by which they are fastened together to form a hinge. The leaf 39 is fastened directly to the partition wall 6 of the camera. The bed plate 38 and the leaf 39 carry thereon the two sections 42 and 43 of a runway on which the lens carrier is adapted to travel. The lens carrier may be of any preferred construction and the one shown herewith is substantially the same as that shown in Patent No. 1,042,023 issued to Charles Miller.

On each side of the leaf 39 are mounted the brackets 44 and 45, each of which brackets is provided with an upright arm 46 such as is shown in Figs. 1 and 5. On each of these brackets at the upper end is provided a stud 47. On the bed plate 38 are provided the brackets 48 and 49 on which are pivotally mounted the side arms 50 and 51. Also fastened to the brackets 48 and 49 are the kick springs 52 and 53 which normally press the side arms 50 and 51 upward for a purpose that will presently be described.

Each of the side arms is provided with a longitudinal slot 54 which has a right angle recess 55 at the upper end thereof. When the bed plate 38 has been turned down to its horizontal position and extends at right angles to the camera frame, the springs 52 and 53 tend to throw the side arms 50 and 51 up, causing them to move up and out at their upper ends and engage the recesses 55 with the studs 47, by which the side arms are locked in position, holding the bed plate firmly in place. In this position the lens front may be drawn upward so as to rest in any desired position upon the bed plate 38 of the camera.

The bed plate 38 is provided with a plate 56 having a slot 57 therein through which pass the screws 58 and 59 by which it is fastened to the bed plate 38. By means of these screws a limited longitudinal adjustment is provided for this plate by which it may be clamped in any desired position to compensate for variations in the focal length of lenses with which the camera may be provided. On the forward end of this plate 56 is provided an adjustable stop 60. This stop is mounted to swing or rotate upon a stem 61, which stem has a helical spring 62 coiled around it, the lower end of which bears upon the stop 60 and holds it in its lowest position. The stop 60 is provided with a lug 63 depending therefrom which is capable of engaging either of two or more recesses or notches in the plate 56, such notches being shown at 64 and 65. On the stop 60 is provided an upturned end 66 adapted to engage with a lug 67 carried on the lens carrier. By placing the stop 60 in either of the positions in which it engages the recesses 64 or 65, the lug 66 is positively held in the path of the lug 67 carried on the lens carrier and will stop it in either of two positions. One of these positions is preferably the position in which the camera will be focused at a short distance, and the other position is one in which the camera will be focused for a long distance or for infinity. Other adjustments may be provided on this as well, so that by placing the stop accordingly the lens carrier of the camera may be stopped in the correct focus for a predetermined distance. On the bed of the camera is also provided a perforated lug or bracket 68 with the perforation 69 therein, with which engages the locking device 70 carried on the spring 71 which is controlled by the button 72 on the side of the camera. On the upright arm 46 is provided a lug 87 with which engages the spring 52 when the bed plate is folded up, as shown in Fig. 5. The position of the parts is such that the spring 52 is flexed or compressed against the lug 87 as the bed plate is closed, and when the bed plate is released the spring 52 expands and throws the bed plate out so that it may be turned down.

The leaf 39, the bed plate 38, the brackets 44 and 45, the upright arms 46 and the side arms 50 and 51 and all the parts associated therewith, are so constructed and arranged that they may be completely assembled independent of the body of the camera, and after being so assembled they can be placed in the body of the camera and fastened in position, bringing all of the parts into the proper relation with each other and with the remaining parts of the camera body, so that further adjustment is dispensed with.

The bellows frame 35 consists of a rectangular frame made preferably of metal having the runners 73 and 74 that engage with grooves 75 and 76 in the camera body, making a light tight joint therewith. The bellows frame is placed in position by first placing either runner 73 or 74 in engagement with its groove forcing it all the way therein, which enables the other runner 74 to be brought into line with its groove, into which it can be moved half way and the bellows frame can then be fastened in this midway position as follows: Each end of the frame is provided with lugs 77 and 77ª, which lugs engage in corresponding recesses in the partitions 5 and 6, and when the bellows frame is brought to its proper mid position these lugs are fastened to the partitions 5 and 6 by means of screws, so that the bellows frame is held in such a position that light cannot leak past it on either of the long sides thereof. The ends of the bellows frame securely engage with the partitions 5 and 6 so as to form a light tight joint therewith. On each end of the bellows frame are provided brackets such as are shown at 78 and 79, in which are mounted the rollers 80 and 81, over which rollers travels the film 20 as it passes from the spool 19 to the spool 21.

The lower end of the camera is provided with a sliding foot 82 shown in Figs. 1 and 5, which may be drawn forward for the purpose of forming a stable support for holding the camera in an upright position with the bed plate extended, as shown in Fig. 1.

In the sliding plate 11 is provided the spring catch 83 which consists of a plate mounted to rock around the pivot 84, the outer end of which is normally pressed out by the spring 85. When so pressed out the upper end of the plate engages under the top plate of the camera at 86 and holds the slide 11 locked in position. By pressing in the lower end of the plate 83 the sliding plate 11 is released so that it can be drawn up and out of the camera.

We claim:

1. In a camera, the combination of a camera body, a leaf fastened directly to said camera body, a bed plate, said leaf and bed plate both having knuckles formed integral therewith and pintles for connecting them directly together, runways on said leaf and said bed plate, upright arms on said leaf, side arms pivotally mounted on said plate, studs on said upright arms with which said side arms engage, springs on said bed plate for engaging with said side arms and pushing them upward against said lugs, a lug on one of said upright arms and integral therewith, with which one of said springs engages and by which it is flexed when the bed plate is closed.

2. The combination in a camera of a camera body having a rectangular opening central thereof, a bellows frame adapted to engage with and fill said opening, said bellows frame having runners on each side thereof, said camera body having grooves with which said runners are adapted to engage.

3. The combination in a camera of a camera body having a rectangular opening central thereof, a bellows frame adapted to engage with and fill said opening, said bellows frame having runners on each side thereof, said camera body having grooves with which said runners are adapted to engage, lugs at the top and bottom of said bellows frame adapted to engage with the ends of said central compartment to be fastened thereto.

4. The combination in a camera of a camera body having a rectangular opening central thereof, a bellows frame adapted to engage with and fill said opening, said bellows frame having runners on each side thereof, said camera body having grooves with which said runners are adapted to engage, brackets on the ends of said bellows frame, rollers mounted in said brackets.

5. In a camera, the combination of a camera body, a frame comprising a leaf and a bed plate having knuckles integral therewith by which they are directly pivoted together, said leaf being permanently and immovably fastened to the camera body, brackets fastened on said leaf having upright arms with lugs integral therewith, said arms pivotally mounted on the bed plate and engaging with said lugs, said frame being constructed so as to permit the complete assembling thereof independent of the camera body, and the subsequent insertion and fastening thereof to the camera body.

In testimony whereof we affix our signatures in presence of two witnesses.

HENRY H. TURNER.
SIMON SCHIDAKOVITCH.

Witnesses:
LENA M. ASH,
ERIC ISCHINGER.